United States Patent
Hasegawa

(10) Patent No.: US 7,153,128 B2
(45) Date of Patent: Dec. 26, 2006

(54) PRESS MECHANISM, CLAMP MECHANISM, AND MOLDING MACHINE USING THIS CLAMP MECHANISM

(75) Inventor: Shoji Hasegawa, Tokyo (JP)

(73) Assignee: Bionics Corporation, Tokyo (JP)

( * ) Notice: Subject to any disclaimer, the term of this patent is extended or adjusted under 35 U.S.C. 154(b) by 265 days.

(21) Appl. No.: 10/975,907

(22) Filed: Oct. 28, 2004

(65) Prior Publication Data

US 2005/0109229 A1   May 26, 2005

Related U.S. Application Data

(63) Continuation of application No. PCT/JP03/12026, filed on Sep. 19, 2003.

(30) Foreign Application Priority Data

Sep. 20, 2002   (JP)   ............... 2002-275369

(51) Int. Cl.
   *B29C 33/22*   (2006.01)
   *B30B 1/02*   (2006.01)
(52) U.S. Cl. .................. 425/590; 74/519; 74/522; 100/276; 100/277; 100/280; 425/451.2; 425/451.5; 425/592
(58) Field of Classification Search ............ 425/450.1, 425/589, 451.2, 590, 451.5, 592; 100/276, 100/277, 280; 74/519, 522, 834
See application file for complete search history.

(56) References Cited

U.S. PATENT DOCUMENTS 2,162,922 A * 6/1939 Schmidt .................. 100/276
2,424,906 A * 7/1947 Sharrock et al. ............ 100/280
2,492,878 A * 12/1949 Miollis ..................... 100/280
4,376,744 A * 3/1983 DeSantis ................. 425/451.5
5,182,967 A * 2/1993 Yoshizawa et al. ............ 74/522
5,315,926 A    5/1994 Kanamaru et al. .......... 100/218
5,388,981 A * 2/1995 Scharrenbroich ........ 425/450.1
5,479,838 A * 1/1996 Yoshizawa ................... 74/522
5,840,349 A    11/1998 Brown, Jr. et al. ......... 425/532

FOREIGN PATENT DOCUMENTS

JP    7-112469    5/1995
JP    2703097    10/1997
JP    3159450    2/2001

OTHER PUBLICATIONS

International Search Report (PCT) dated Dec. 16, 2003 from parent International Application No. PCT/JP03/12026.

* cited by examiner

*Primary Examiner*—James P. Mackey
(74) *Attorney, Agent, or Firm*—Ohlandt, Greeley, Ruggiero & Perle, L.L.P.

(57) ABSTRACT

A thermal pressing machine has a case in which a fixed-side press plate is fixedly provided, a main shaft to which a moving side press plate is attached, a lever arm pivotally attached to the main shaft, a first drive mechanism coupled to a force point at one end of the lever arm, and a second drive mechanism coupled to a supporting point at the other end of the lever arm. The first drive mechanism first causes the lever arm to pivot on the supporting point to greatly move the press plate, and the first drive mechanism is then stopped to operate the second drive mechanism, so that the lever arm pivots on the force point to press the press plate against the press plate.

11 Claims, 11 Drawing Sheets

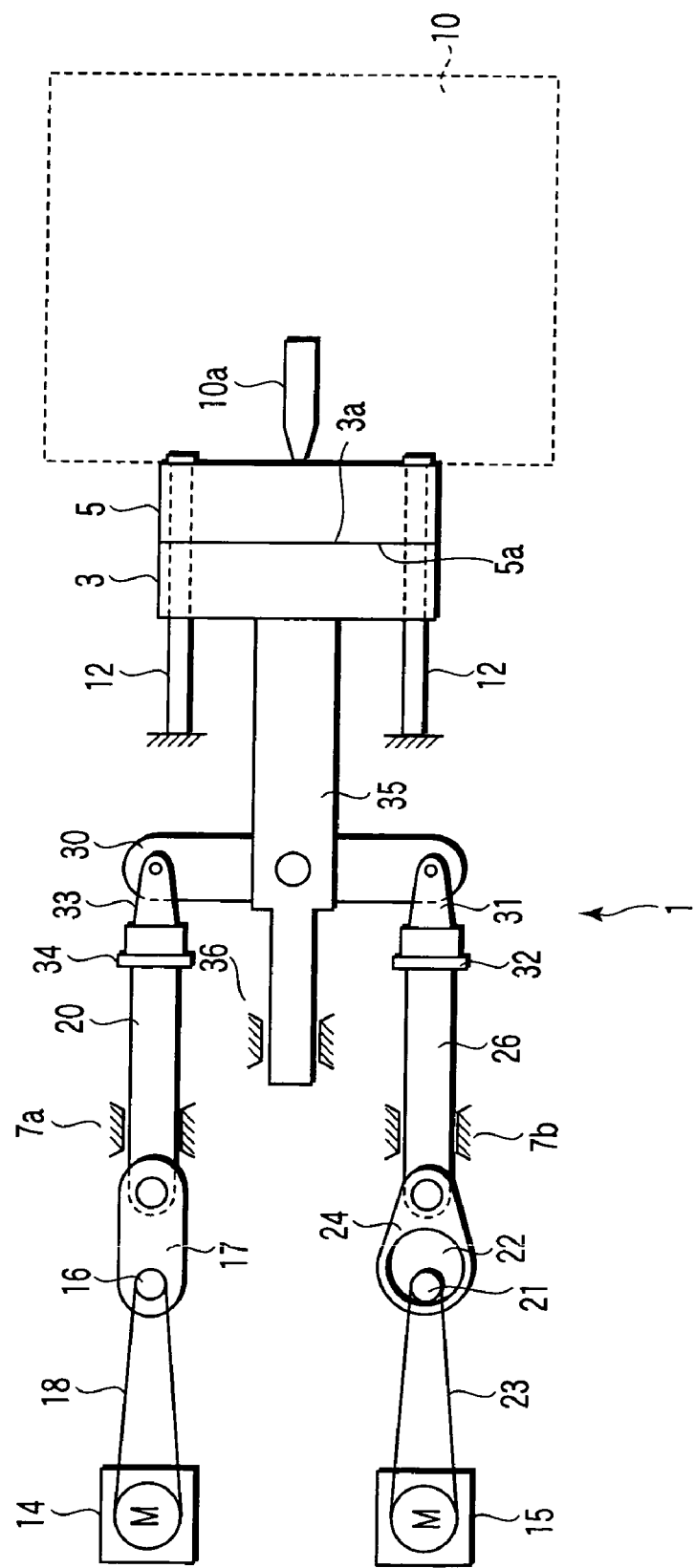
F I G. 2

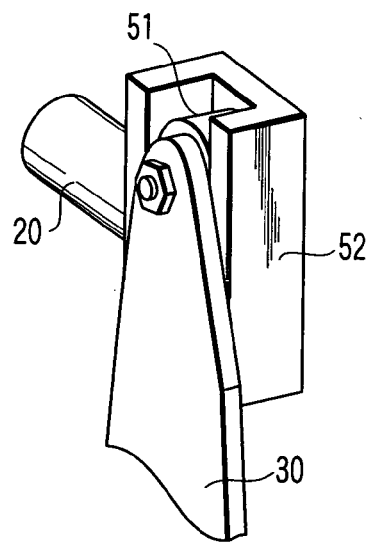 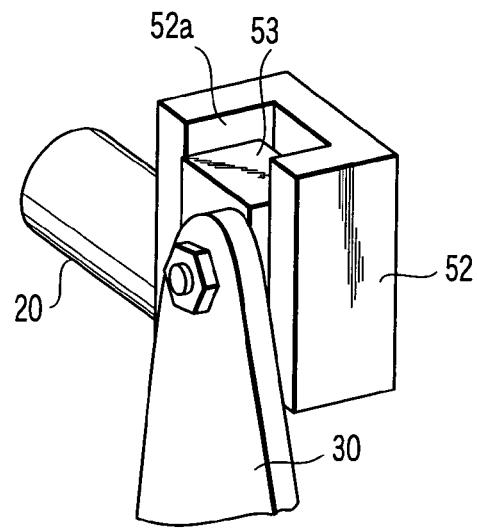
FIG. 11    FIG. 12
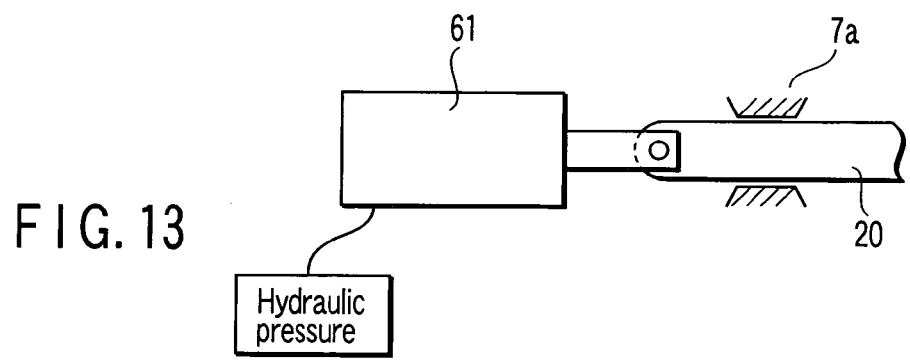
FIG. 13
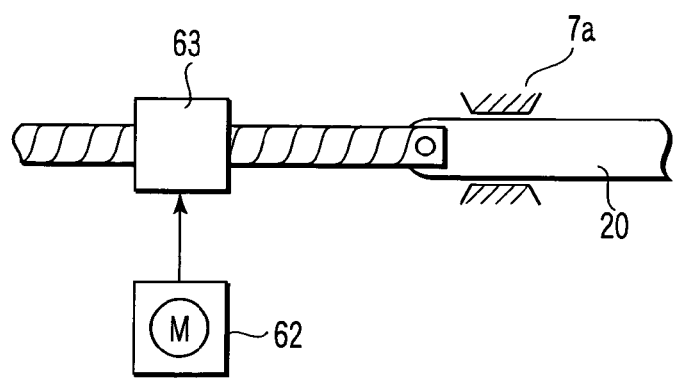
FIG. 14

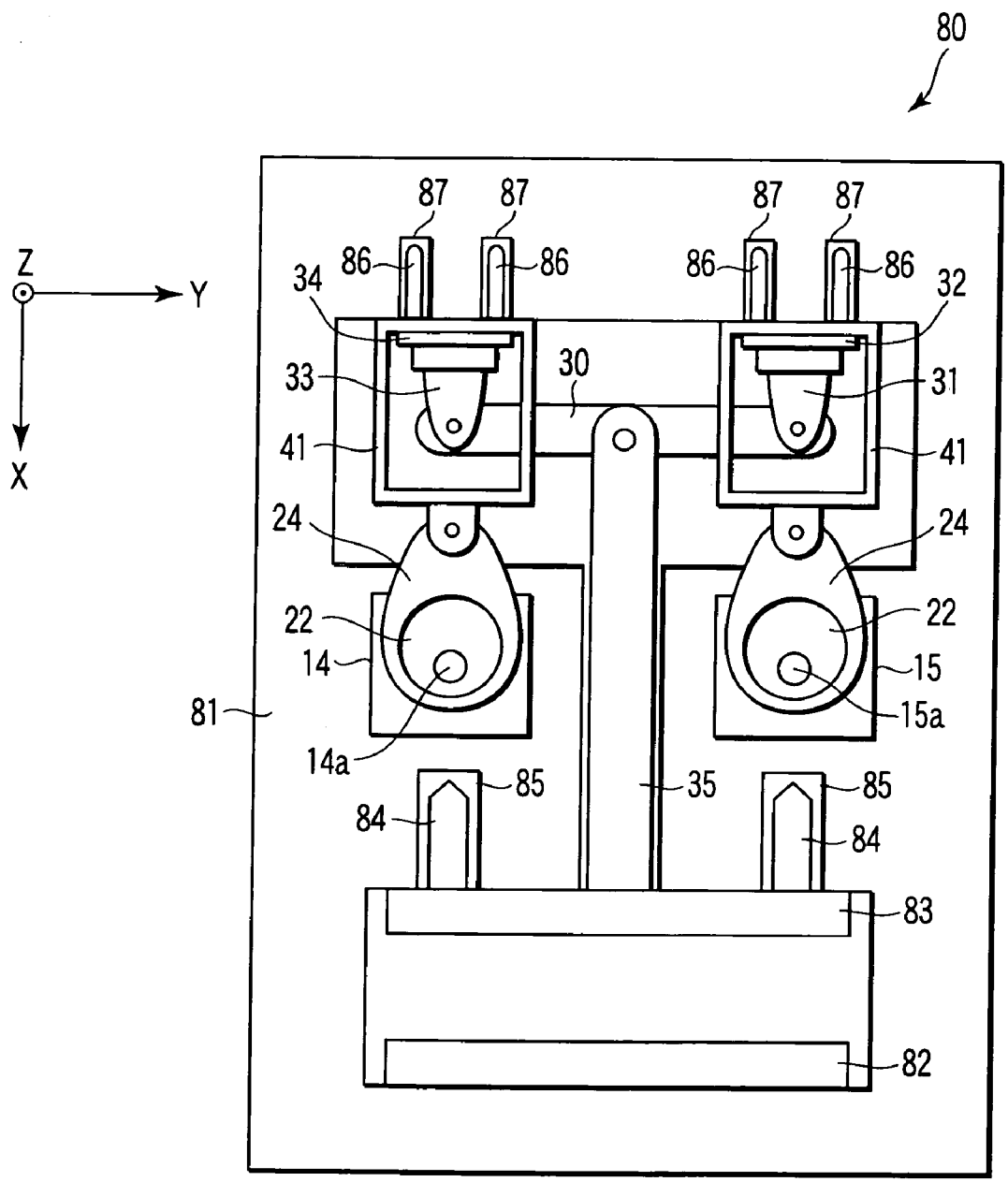
F I G. 15

PRESS MECHANISM, CLAMP MECHANISM, AND MOLDING MACHINE USING THIS CLAMP MECHANISM

CROSS-REFERENCE TO RELATED APPLICATIONS

This is a Continuation Application of PCT Application No. PCT/JP03/12026, filed Sep. 19, 2003, which was published under PCT Article 21(2) in Japanese.

This application is based upon and claims the benefit of priority from prior Japanese Patent Application No. 2002-275369, filed Sep. 20, 2002, the entire contents of which are incorporated herein by reference.

BACKGROUND OF THE INVENTION

1. Field of the Invention

This invention relates to a press mechanism to drive a press plate, a clamp mechanism of a molding machine which drives one die toward another die, and a molding machine comprising this clamp mechanism.

2. Description of the Related Art

In a press mechanism or a clamp mechanism of a molding machine, a toggle mechanism using, for example, a lever has heretofore been used as a mechanism to drive a press plate (refer to, for example, FIG. 5, description of U.S. Pat. No. 3,159,450). The toggle mechanism urges the press plate to produce torque at its bottom dead center. The toggle mechanism is suitable for the press mechanism and the clamp mechanism of the molding machine because the toggle mechanism can stably produce great pressure and can move the press plate with a great stroke.

Furthermore, as a clamp mechanism for the molding machine, a mechanical device utilizing leverage is known, and this mechanical device uses a drive force from two drive sources to clamp the press plate in two stages (refer to, for example, FIG. 1 to FIG. 4, description of U.S. Pat. No. 3,159,450). This mechanical device is configured in such a manner that an action point is provided at one end of a lever member, a supporting point (or a force point) is provided at the other end, a force point (or a supporting point) is provided in between and the press plate is coupled to the action point. In operating this mechanical device, the force point is first urged so that the lever member pivots on the supporting point, and then with the force point as the supporting point, the supporting point is urged so that the lever member pivots on the force point.

Furthermore, there is leverage in which a supporting point is provided at one end of a lever member, a force point is provided at the other end, an action point is provided in between and a press plate is coupled to this action point (refer to, for example, FIG. 3, description of U.S. Pat. No. 2,703,097). This leverage urges the force point so that the lever member pivots on the supporting point to drive the press plate.

The toggle device shown in FIG. 5 of the description of U.S. Pat. No. 3,159,450 mentioned above can produce comparatively great torque and can have a great moving stroke of the press plate, but its problem is that the position and pressure of the press plate cannot be controlled with high accuracy in the vicinity of the bottom dead center.

Furthermore, the problem of the two-stage driving leverage shown in FIG. 1 to FIG. 4 of the description of U.S. Pat. No. 3,159,450 is that, because the action point to act on the press plate is provided closer to one end of the lever member, torsional stress functions when the two drive sources are used to urge the press plate such that highly accurate parallelism of the press plate cannot be maintained.

Still further, in the leverage shown in FIG. 3 of the description of U.S. Pat. No. 2,703,097 mentioned above, the moving stroke of the action point is smaller than the moving stroke of the force point, so that when the press plate is to be moved with a great stroke, the force point needs to be moved more greatly. With such large movement of the force point, the lever member pivots greatly, and undesirable stress acts on the lever member along its longitudinal direction, thus making it impossible to maintain the highly accurate parallelism of the press plate.

Further yet, in this leverage, one drive source urges the force point to pivot the lever member, so that if a drive source is used which is suitable for moving the press plate with a great stroke, the position and pressure of the press plate cannot be controlled with high accuracy.

BRIEF SUMMARY OF THE INVENTION

This invention has been attained in view of the foregoing, and its object is to provide a press mechanism, a clamp mechanism and a molding machine using this clamp mechanism in which the position and pressure of a press plate can be controlled with high accuracy while highly accurate parallelism of the press plate is maintained.

According to the press mechanism of the invention, the force point at the other end of the lever member is urged so that the lever member pivots on the supporting point at one end, in order to drive the shaft coupled to the action point in between, that is, the press plate. Subsequently, the supporting point at one end of the lever member is urged so that the lever member pivots on the force point to drive the press plate. In each case, the drive force functions from both sides of the action point, and sliding frictional forces of the supporting point and the force point work on the action point in opposite directions, and stresses except in the driving direction of the shaft cancel each other at the action point, so that undesirable stress can be prevented from being produced in the whole press mechanism. Thus, highly accurate parallelism of the press plate can be maintained and the position and pressure of the press plate can be controlled with high accuracy.

Especially, if the distances from the supporting point and the force point to the action point are made equal and the sliding frictional forces of the first and second support mechanisms are made equal, undesirable stress can be prevented from being produced almost completely, and the parallelism of the press plate can be significantly high.

Furthermore, since the lever member pivots in two stages to drive the press plate in two stages, the pressure and bottom dead center of the press plate can be controlled with high accuracy. It is to be noted that when the stroke of the action point may be small, one of the support mechanisms may be fixedly provided in the case of a device, in which case, undesirable stress can also be prevented from being produced by the same principle as described above, and the pressure and bottom dead center of the press plate can be controlled with high accuracy.

According to the clamp mechanism of the invention, the force point at the other end of the lever member is urged so that the lever member pivots on the supporting point at one end to move the first die coupled to the action point toward the second die. Moreover, this clamp mechanism urges the supporting point so that the lever member pivots on the force point to move the first die. Thus, the first die can be driven straight, without causing torsional stress, toward the second die fixedly provided in the case in which the supporting point and force point are fixedly attached. In this way, the parallelism of the joint surfaces of the first and second dies can be maintained highly accurately and the position of the first die with respect to the second die and the pressure thereof can be controlled with high accuracy.

BRIEF DESCRIPTION OF THE SEVERAL VIEWS OF THE DRAWING

FIG. 2 is a plan view of the schematic structure of the injection molding machine of FIG. 1;

FIG. 11 is a partial perspective view of a modification of the force point rocking mechanism of FIG. 5;

FIG. 12 is a partial perspective view of another modification of the force point rocking mechanism of FIG. 5;

FIG. 13 is a schematic diagram showing a modification of the drive mechanism of the injection molding machine of FIG. 1 and the thermal pressing machine of FIG. 15;

FIG. 14 is a schematic diagram showing another modification of the drive mechanism of the injection molding machine of FIG. 1 and the thermal pressing machine of FIG. 15;

FIG. 15 is a front view of the schematic structure of the thermal pressing machine according to the embodiment of this invention.

DETAILED DESCRIPTION OF THE INVENTION

Embodiments of this invention will hereinafter be described in detail with reference to the drawings.

Figure 1:
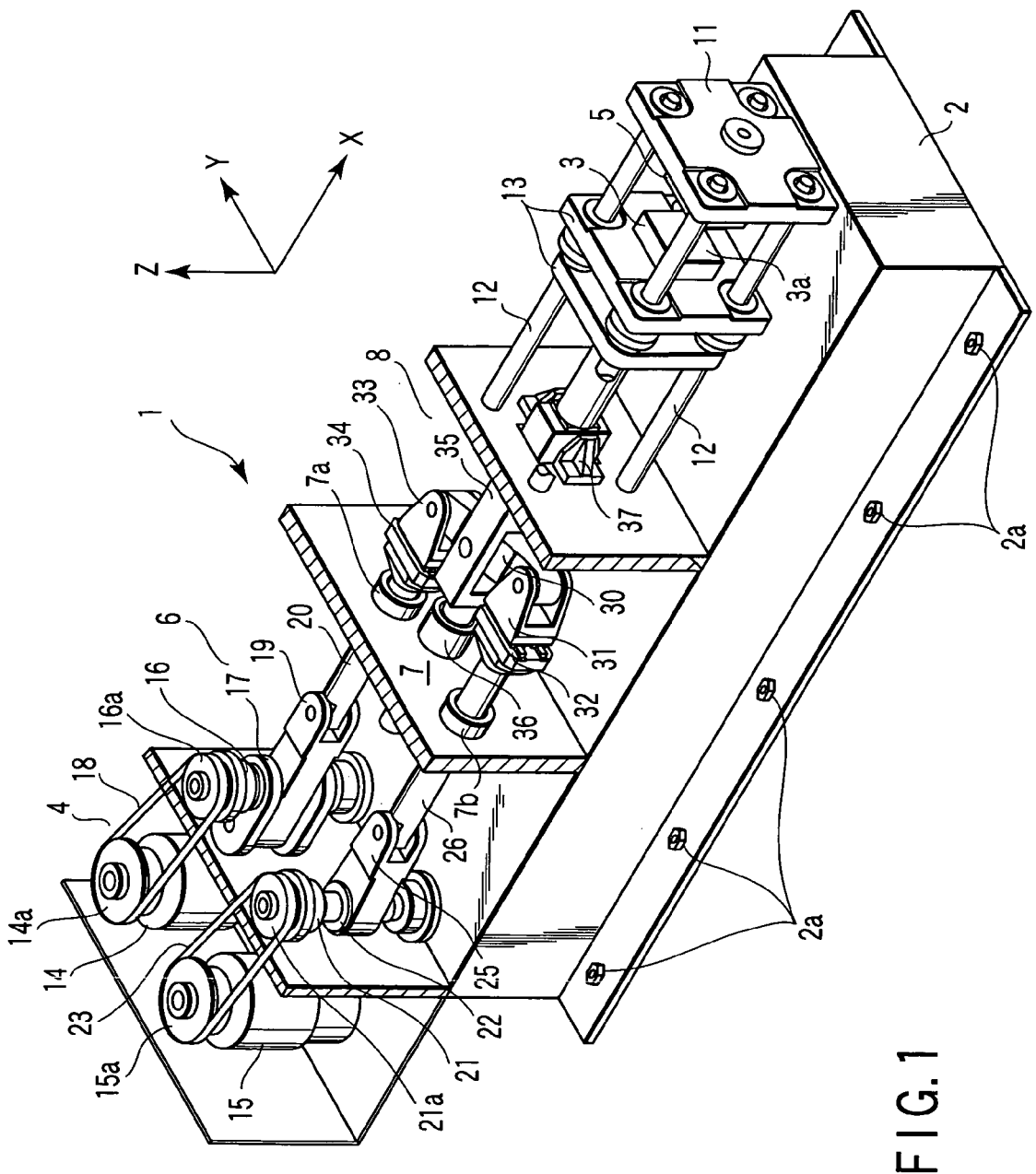
FIG. 1 is a perspective view of a schematic structure of an injection molding machine according to embodiments of this invention.

FIG. 1 is a schematic perspective view of a plastic injection molding machine 1 (hereinafter referred simply as an injection molding machine 1) which functions as a molding machine according to embodiments of this invention. FIG. 2 is a schematic plan view of this injection molding machine 1. In FIG. 1, a frame 2 of the injection molding machine 1 is shown in a partially disassembled state for clarity in the drawing, and an injection device 10 (see FIG. 2) which will be described later is not shown.

As shown in FIG. 1, the frame 2 (case) of the injection molding machine 1 is fixed to level ground by a plurality of stud bolts 2a (and nuts). The frame 2 integrally has a plurality of partitions which divide into a motor chamber 4, a crank chamber 6 and a lever chamber 8, along a driving direction (arrow X direction in the drawing; hereinafter referred to as an X direction) of a moving-side die 3 (first die) which will be described later.

Furthermore, on the frame 2, a rectangular plate shaped fixed platen 11 (fixed member) fixedly provided with a fixed-side die 5 (second die) which will be described later is fixedly provided at a standing position. The fixed platen 11 is attached with highly accurate angle adjustment such that a joint surface 5a (see FIG. 2) described later of the fixed-side die 5 extends along a plane (YZ plane) perpendicular to the X direction.

Moreover, ends of four tie bars 12 (guide members) are fixedly provided at four corners of the fixed platen 11, respectively. The four tie bars 12 are provided to extend in the X direction parallel to each other, and have their other ends fixed on the partition of the lever chamber 8 on the other side of the crank chamber 6. In other words, the plurality of partitions dividing into the chambers, the four tie bars 12, the fixed platen 11 and the fixed-side die 5 are fixedly provided in the frame 2.

A rectangular plate shaped movable platen 13 (press plate, moving member) is attached slidably in the X direction to the four tie bars 12 which are provided to extend between the fixed platen 11 and the lever chamber 8. More specifically, the movable platen 13 has four slide bores through which the four tie bars 12 can slide, respectively.

The moving-side die 3 to be joined to the fixed-side die 5 is fixedly provided on the side of the movable platen 13 facing the fixed platen 11. The movable platen 13 slides along the four tie bars while maintaining highly accurate parallelism so that a joint surface 3a of the moving-side die 3 always extends along the YZ plane.

Two AC servomotors 14, 15 are disposed in the motor chamber 4. Each of the motors 14, 15 has its rotation shaft attached to extend in the arrow Z direction in the drawing, and sprockets 14a, 15a are attached to the respective rotation shafts.

Two crank mechanisms are disposed in the crank chamber 6. The crank mechanism on the far side of the drawing (hereinafter referred to as a first crank mechanism) has a crank shaft 16 fixedly provided on the frame 2 and extending in the Z direction, and a crank arm 17 whose one end is fixedly provided in the crank shaft 16. A sprocket 16a is fixedly provided at an upper end of the crank shaft 16. An endless chain 18 which is wound around the sprocket 14a attached to the rotation shaft of the above-mentioned AC servomotor 14 is wound around the sprocket 16a.

A base end portion of a coupling member 19 is pivotally attached to an end of the crank arm 17 away from the crank shaft 16. A base end portion of a slide shaft 20 is pivotally attached to an end of the coupling member 19. The slide shaft 20 extends through a cylindrical slide shaft guide 7a provided in a partition 7 between the crank chamber 6 and the lever chamber 8, and has its end protruding into the lever chamber 8.

The crank mechanism on the near side of the drawing (hereinafter referred to as a second crank mechanism) has an eccentric shaft 21 fixedly provided on the frame 2 and provided to extend in the Z direction, and an eccentric cam 22 attached eccentrically to the eccentric shaft 21. A sprocket 21a is fixedly provided at an upper end of the eccentric shaft 21. An endless chain 23 which is wound around the sprocket 15a attached to the rotation shaft of the above-mentioned AC servomotor 15 is wound around the sprocket 21a.

A cam follower 24 (see FIG. 2) is attached to the eccentric cam 22. A base end portion of a coupling member 25 is pivotally attached to the cam follower 24. A base end portion of a slide shaft 26 is pivotally attached to an end of the coupling member 25. The slide shaft 26 extends through a cylindrical slide shaft guide 7b provided in the partition 7 between the crank chamber 6 and the lever chamber 8, and has its end protruding into the lever chamber 8.

The AC servomotor 14 and the first crank mechanism described above function as a first drive mechanism of the present invention, and the AC servomotor 15 and the second crank mechanism function as a second drive mechanism of the present invention.

Therefore, when the AC servomotor 14 on one side is driven, the first crank mechanism is actuated, and the slide shaft 20 slides in the X direction. Further, when the AC servomotor 15 on the other side is driven, the second crank mechanism is actuated, and the slide shaft 26 slides in the X direction.

Figure 3:
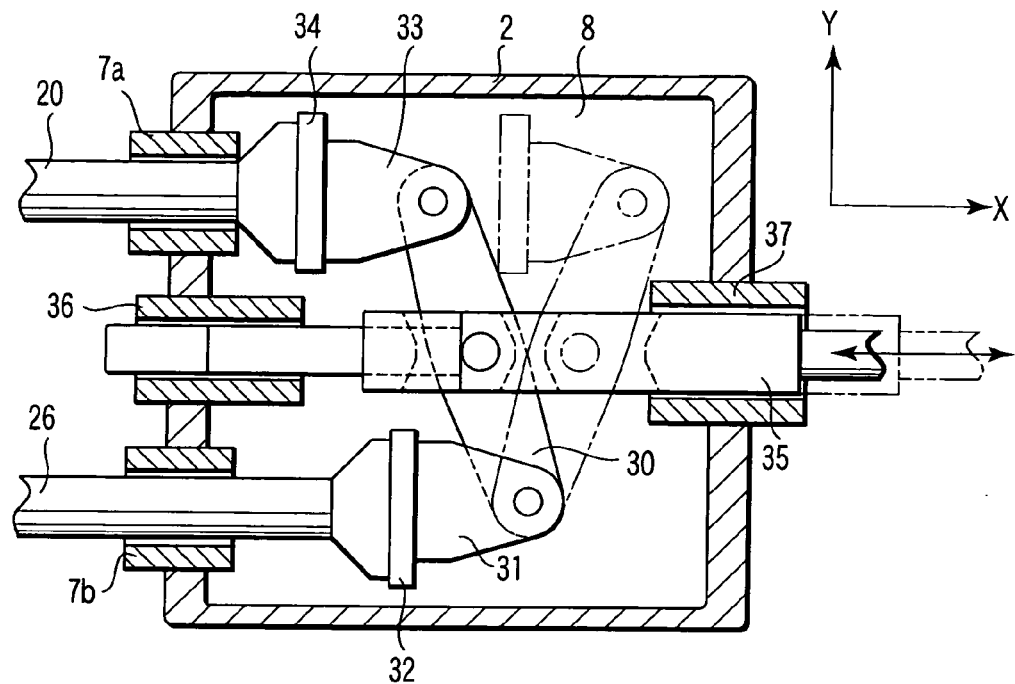
FIG. 3 is a partially enlarged view of the structure of essential parts of the injection molding machine of FIG. 2.
Figure 4:
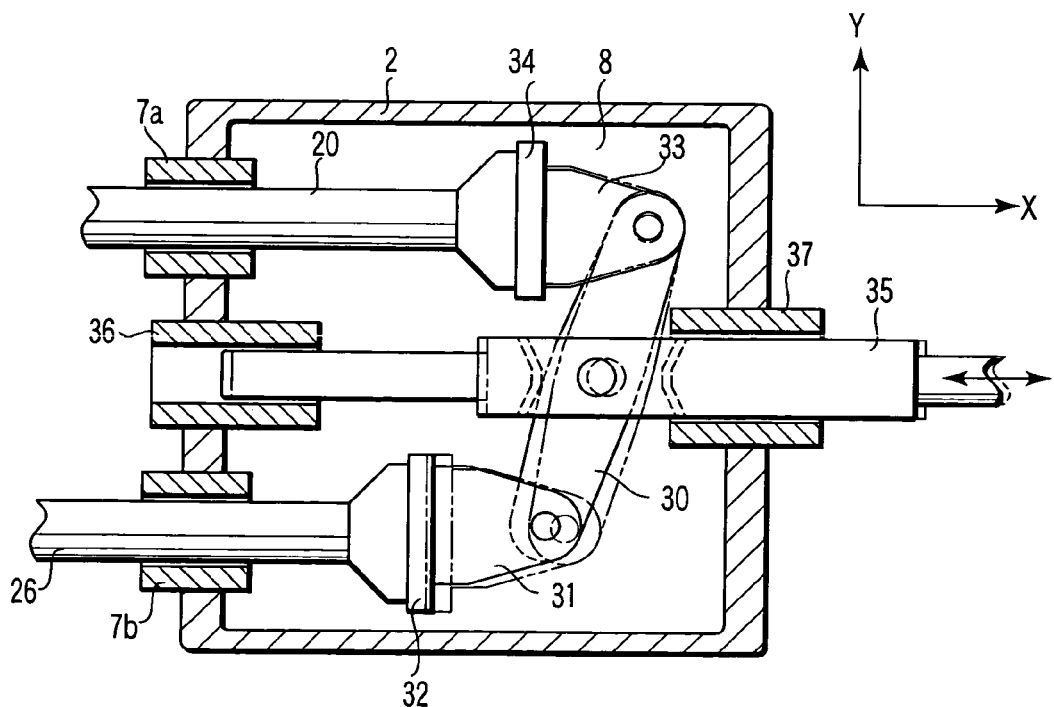
FIG. 4 is a diagram to explain the operation of the essential parts together with FIG. 3.

In the lever chamber 8, an elongated plate shaped lever arm 30 (lever member) is provided movably along an XY plane, as shown in a partially enlarged manner in FIG. 3 and FIG. 4. The lever arm 30 is provided to extend substantially along the Y direction. A supporting point is provided at one end of the lever arm 30, a force point is provided at the other end, and an action point is provided between the supporting point and the force point. In the present embodiment, the action point is located right at the midpoint between the supporting point and the force point.

An end of the slide shaft 26 described above is connected to the supporting point of the lever arm 30 via a supporting point rocking mechanism (second support mechanism). The supporting point rocking mechanism has a supporting point block 31 pivotally supporting the lever arm 30 at its supporting point, and a slide rail 32 fixedly provided at the end of the slide shaft 26 and attaching the supporting point block 31 slidably in the Y direction.

Figure 5:
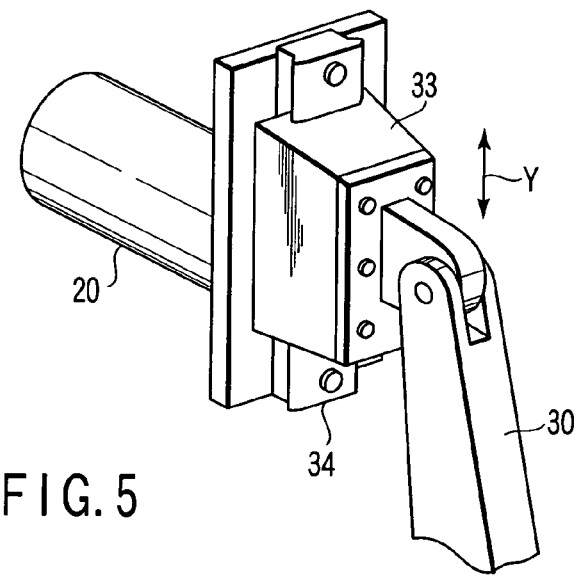
FIG. 5 is a partial perspective view of a schematic structure of a force point rocking mechanism provided at a force point of a lever arm of FIG. 3.

An end of a slide shaft 20 mentioned above is connected to the force point of the lever arm 30 via a force point rocking mechanism (first support mechanism). The force point rocking mechanism has a force point block 33 pivotally supporting the lever arm 30 at its force point, and a slide rail 34 fixedly provided at the end of the slide shaft 20 and attaching the force point block 33 slidably in the Y direction. FIG. 5 is a representative partially enlarged perspective view of the force point rocking mechanism.

The supporting point rocking mechanism and the force point rocking mechanism in the present embodiment use direct acting guides having the same structure. However, the supporting point rocking mechanism and the force point rocking mechanism do not always need to be the same, and have only to be the same in the sliding friction in the present embodiment. That is, in the present embodiment, the distance from the supporting point to the action point of the lever arm 30 and the distance from the force point to the action point are equal, so that if the sliding friction acting on the supporting point is equalized to the sliding friction acting on the force point, stress caused by the sliding frictional forces acting in the opposite directions from each other to act on the lever arm 30 is offset at the action point. This prevents torsional stress from being caused at the supporting point of the lever arm 30.

An intermediate portion of a main shaft 35 (shaft) is pivotally connected to the action point of the lever arm 30. The main shaft 35 is provided to extend through a cylindrical main shaft guide 36 provided in the partition 7 between the crank chamber 6 and the lever chamber 8, and through a main shaft guide 37 provided in the opposite partition of the lever chamber 8. These two main shaft guides 36, 37 guide the main shaft 35 so that the main shaft 35 extends straight in the X direction with high accuracy.

A base end portion of the main shaft 35 extends through the main shaft guide 36 into the crank chamber 6 where it terminates in a free state. The center of the movable platen 13 mentioned above is connected and fixed with high perpendicularity to a leading end portion of the main shaft 35.

Figure 6:
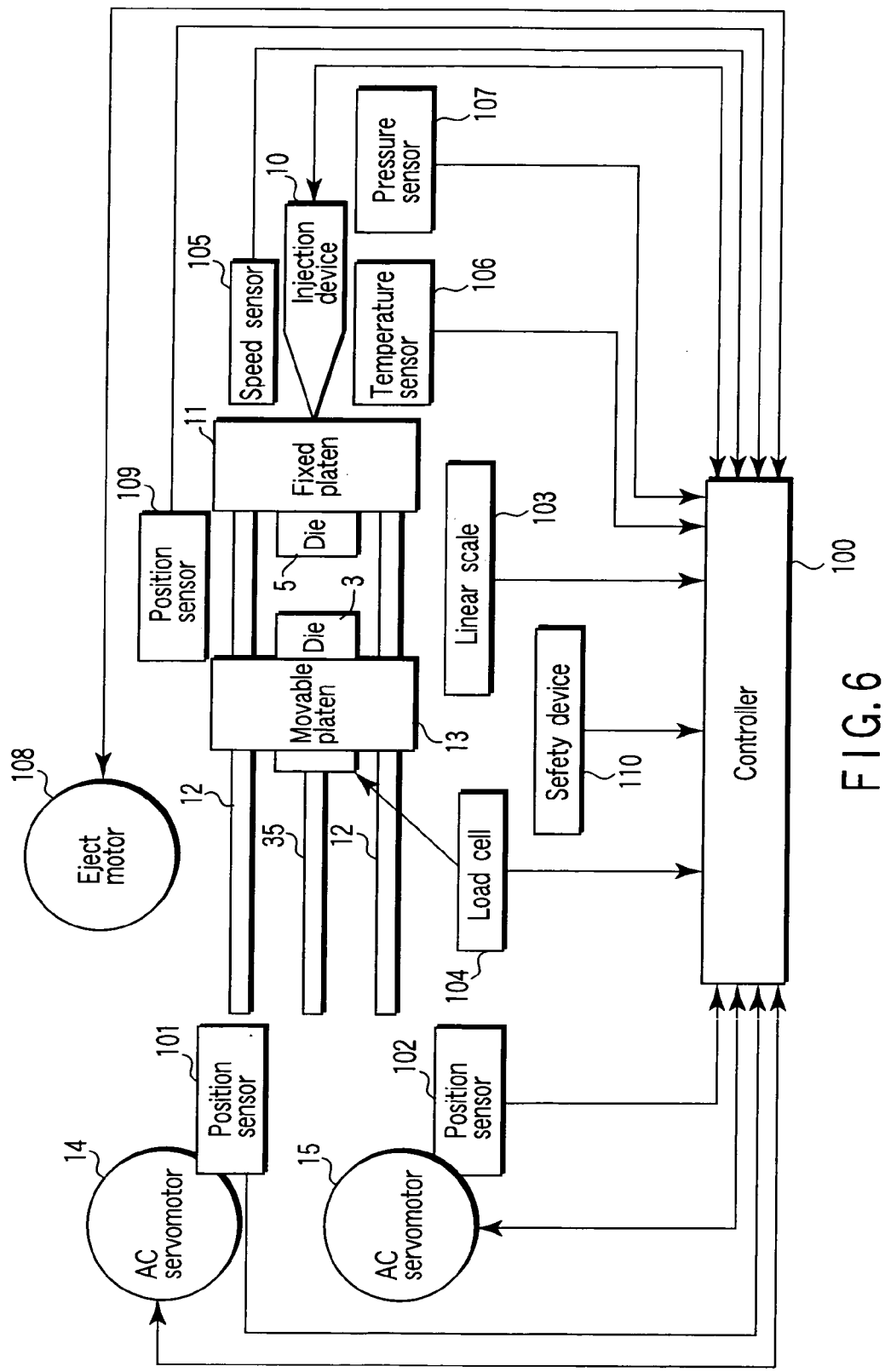
FIG. 6 is a block diagram of a control system to control the operation of the injection molding machine of FIG. 1.

FIG. 6 is a block diagram of a control system to control the operation of the injection molding machine 1 described above.

The two AC servomotors 14, 15 and two position sensors 101, 102 provided to correspond to the motors 14, 15 are connected to a controller 100 to control the operation of the injection molding machine 1. Each of the position sensors 101, 102 detects a crank position needed to control the AC servomotors 14, 15.

Furthermore, a linear scale 103 to measure by the micron the position along the X direction of the movable platen 13, that is, the moving-side die 3, and a load cell 104 to measure the press force of the moving-side die 3 are connected to the controller 100. The load cell 104 can measure the pressure on the die 3 by an order of about 0.2% of a maximum pressure, and, for example, can measure the pressure by 100 kg when the maximum pressure is 50 tons.

Still further, the injection device 10 (supply mechanism) which will be described later, a speed sensor 105 to measure the injection speed of a resin material (material to be formed) injected from a nozzle 10a (see FIG. 2) of the injection device 10, a temperature sensor 106 to measure the injection temperature of the resin material, and a pressure sensor 107 to measure the injection (supply) pressure of the resin material are connected to the controller 100.

Further yet, an eject motor 108, a position sensor 109 provided to correspond to this eject motor 108, and a safety device 110 are connected to the controller 100. The eject motor 108 drives a ball screw (not shown) to eject a molded article from the die 3. The position sensor 109 detects a starting point and an end point of the ball screw. The safety device 110 ascertains that a device cover is closed. In addition, an emergency stop switch and the like are also included in the safety device 110.

Next, the operation of the injection molding machine 1 described above will be described.

First, the AC servomotor 15 to operate the second crank mechanism is stopped, and the supporting point of the lever arm 30 is stopped. This state is indicated with a full line in FIG. 3. In this state, the supporting point of the lever arm 30 is not capable of moving in the X direction and is slidable in the Y direction.

Subsequently, in this state, the AC servomotor 14 which operates the first crank mechanism is urged, and the first crank mechanism is operated to slide the slide shaft 20, and then the force point rocking mechanism largely slides to a position indicated with a broken line in FIG. 3. Thus, the lever arm 30 greatly pivots on the supporting point from the position indicated by the full line to the position indicated by the broken line, and the main shaft 35 connected to the action point of the lever arm 30 greatly slides in the X direction. Then, the moving-side die 3 attached to the end of the main shaft 35 is moved greatly toward the fixed-side die 5. In the present embodiment, the structure of the first crank mechanism is designed such that the moving distance of the die 3 in this regard will be about 150 mm to 300 mm, for example, about 250 mm.

Meanwhile, the supporting point block 31 of the supporting point rocking mechanism attached to the slide shaft 26 and the force point block 33 of the force point rocking mechanism attached to the slide shaft 20 once slide outward along the Y direction and return the initial positions. This allows the main shaft 35 to move straight in the X direction. In other words, the sliding frictional forces in the supporting point rocking mechanism and the force point rocking mechanism act, from opposite directions, on the action point right at the midpoint between them, and the stress due to the sliding frictions will be offset at the action point.

Furthermore, the structure of the first crank mechanism and the length of the slide shaft 20 are set such that when the moving-side die 3 approaches and stops at the fixed-side die 5 in accordance with the operation described above, a clearance between the joint surface 3*a* of the moving-side die 3 and the joint surface 5*a* of the fixed-side die 5 will be at least about several hundred μm to 5 μm. In other words, the first crank mechanism operates so that the slide shaft 20, that is, the die 3 slides comparatively greatly.

Figure 7:
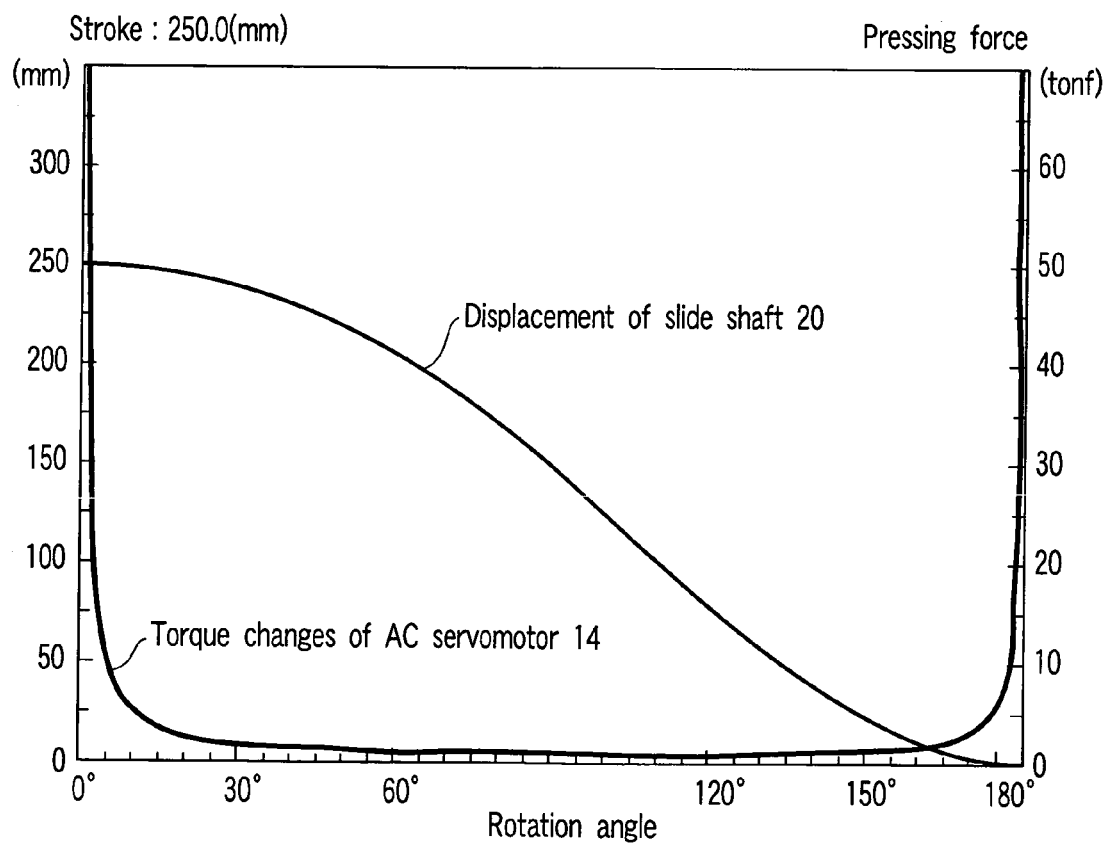
FIG. 7 is a graph showing the displacement of a slide shaft and torque changes of an AC servomotor with regard to the rotation angle of a crank mechanism on the side of the force point during a first stage driving of the injection molding machine of FIG. 1.

FIG. 7 shows changes in torque generated by the AC servomotor 14 and the displacement of the slide shaft 20 in relation to the rotation angle of the first crank mechanism in the present embodiment. This shows that heavy torque is generated when the rotation of the AC servomotor 14 is started and stopped.

After the die 3 is moved with a great stroke as described above, the AC servomotor 14 is in turn stopped to stop the first crank mechanism, and the force point of the lever arm 30 is stopped with respect to the X direction. Thereafter, the force point will function as the supporting point. In the meantime, the force point is slidable in the Y direction owing to the action of the force point rocking mechanism.

In this state, the AC servomotor 15 is urged to operate the second crank mechanism, such that the slide shaft 26 slides along the X direction. At this moment, the lever arm 30, in turn, slightly pivots on the force point of the lever arm 30 which has stopped as described above, from the position indicated with the full line to the position indicated with the broken line in FIG. 4.

At this point, the moving distance of the supporting point is designed to such a value that the moving distance of the moving-side die 3 will be at least about several hundred μm to 5 μm, that is, the joint surfaces 3*a*, 5*a* of the two dies 3, 5 will finally press-contact each other with predetermined pressure. In other words, the second crank mechanism operates so that the slide shaft 26, that is, the die 3 slides slightly.

In this way, in a second stage movement when the die 3 is moved in two stages, the resin material is injected (supplied) via the nozzle 10*a* of the injection device 10. At this point, the nozzle 10*a* is inserted from the rear side of the fixed-side die 5 to inject the resin material, and the injection speed, temperature and pressure of the resin material are monitored by the controller 100 via the sensors 105, 106 and 107.

When the injection of the resin material is started, in the controller 100, the pressure acting on the die 3 is monitored via the load cell 104 and the moving distance of the die 3 is monitored via the linear scale 103, and each mechanism of the injection molding machine 1 is controlled so that the injection pressure of the resin material, the pressure of the die 3 and the moving distance of the die 3 are controlled to proper values.

In this case, for example, during the operation by the second crank mechanism, the clearance between the joint surface 3*a* of the die 3 and the joint surface 5*a* of the die 5 may be changed on a micron basis from several hundred μm to 5 μm, and the pressure is then controlled immediately before the completion of the filling of the resin material, so that the pressure will be increased, for example, from 10 to 50 tons within a predetermined period of time and maintained for a certain period of time. That is, it is possible to move the die 3 while maintaining a constant pressure of the resin material and to move the die 3 while changing the pressure, or to move the die 3 at a constant moving velocity regardless of the pressure of the resin material.

In any case, along with the injection of the resin material, the operation of the second crank mechanism causes the main shaft 35 connected to the center of the lever arm 30 to slide in the X direction and causes the joint surface 3*a* of the moving-side die 3 to press-contact the joint surface 5*a* of the fixed-side die 5.

During this operation, the supporting point block 31 of the supporting point rocking mechanism attached to the slide shaft 26 and the force point block 33 of the force point rocking mechanism attached to the slide shaft 20 slightly slide outward along the Y direction as indicated with the broken line in the drawing. In this case, the sliding frictional forces in the supporting point rocking mechanism and the force point rocking mechanism act, from opposite directions, on the action point right at the midpoint between them, and the stress due to the sliding frictional forces will be offset at the action point.

Furthermore, while the second crank mechanism causes the lever arm 30 to slightly pivoted by, the injection of the resin material is completed, the air is discharged from the clearance between the dies 3, 5, and the press force of the two dies 3, 5 is balanced with the injection pressure of the resin material, so that the resin material goes all over into the two dies 3, 5. Near the end of the pivoting of the lever arm 30 caused by the second crank mechanism, the joint surface 3*a* of the die 3 press-contacts the joint surface 5*a* of the die 5 with the predetermined press force, thereby enhancing transfer quality of a molded article.

Subsequently, after a predetermined cooling time, the two AC servomotors 14, 15 are driven again, and the moving-side die 3 is largely separated from the fixed-side die 5, and an unshown eject mechanism is operated so that the molded article is ejected. At this point, in order to expand a space to eject the molded article, the first crank mechanism functions to greatly separate the dies 3, 5.

As described above, according to the present embodiment, the supporting point at one end of the lever arm 30 alone is urged by the AC servomotor 15 or the force point at the other end alone is urged by the AC servomotor 14, so that the stress caused by reaction force transmitted to the frame 2 via the eccentric shaft 21 and the crank shaft 16 is offset on the axis line of the main shaft 35 coupled to the action point in the middle of the lever arm 30, without causing torsional stress in the frame 2 and the movable platen 13.

More specifically, the four tie bars 12 are located symmetrically with a virtual surface (not shown) which is at an equal distance from a line of action on which the torque produced by the AC servomotor 15 acts, that is, the axis line of the slide shaft 26, and a line of action on which the torque produced by the AC servomotor 14 acts, that is, the axis line of the slide shaft 20. Because the fixed platen 11 on which the fixed-side die 5 is fixedly provided on the four tie bars 12, the torsional stress is not caused in the two dies 3, 5.

Furthermore, according to the present embodiment, the distance from the supporting point to the action point of the lever arm 30 and the distance from the force point to the action point are equal, and the sliding frictional force of the supporting point rocking mechanism is equalized to the sliding frictional force of the force point rocking mechanism, so that the sliding frictional forces caused at the supporting point and the force point when the lever arm 30 pivots will act in the opposite directions from each other with the same force. Thus, the stress caused in the lever arm 30 is always offset at the action point in the center of the lever arm 30, without causing torsional stress in the main shaft 35 coupled to the action point.

Therefore, the main shaft 35 can be driven straight toward the fixed-side die 5, and the parallelism of the joint surfaces 3a, 5a of the two dies 3, 5 to be joined to each other can be significantly higher. Thus, even if the clearance between the joint surfaces of the two dies 3, 5 is extremely small, dimensional accuracy of the clearance can be kept high all over the joint surfaces 3a, 5a, so that the dies 3, 5 do not tilt and contact each other, ensuring that the uniform and significantly small clearance can be formed.

Furthermore, according to the present embodiment, two-stage clamping is possible; the AC servomotor 14 is urged to operate the first crank mechanism so that the lever arm 30 greatly pivots, and then the AC servomotor 15 is urged to operate the second crank mechanism so that the lever arm 30 pivots a little.

For example, in the clamp mechanism of the injection molding machine 1 as described above, because the molded article needs to be ejected, the two dies 3, 5 need to be separated comparatively widely, so that it will be advantageous if the die 3 is moved with a great stroke at a first stage driving of the two-stage clamp mechanism.

From a different point of view, it is possible to control in such a manner that the moving-side die 3 is driven at a relatively high speed toward the fixed-side die 5 at the first stage of the driving to bring them in close proximity, and actual clamping is performed at the second stage of the driving. That is, the first stage drive mechanism and the second stage drive mechanism can be adapted to their functions, and the drive mechanisms (including a drive source and a drive transmitting mechanism) can be more freely designed, enabling more efficient operation.

Furthermore, as described above, since the torsional stress is not caused in the die 3 due to the structure of the present invention, a small and uniform clearance of about several hundred μm to 5 μm can be formed between the joint surfaces 3a, 5a of the two dies 3, 5, and when the resin material is injected into the die in parallel with the second stage of the driving, efficient release of the air alone can be ensured.

In other words, the parallelism of the die 3 is enhanced to improve the positional accuracy of the die 3, that is, clearance accuracy such that a small clearance, which has heretofore been considered unachievable, can be formed between the dies 3, 5, and a molded article can be formed which has good transfer quality and does not cause defects such as valleys, leading to a higher yield ratio. In connection with this, there is an advantage that costs of manufacturing the dies can be significantly reduced.

Effects of the present embodiments will be examined here in greater detail in terms of the dies to be used in the injection molding.

Significantly important points in die manufacturing and designing for the injection molding machine 1 include designing for the number, size and position of air vent holes and filling holes (gates) in a die for use in ultra-precise molding, thin article molding and molding of asymmetrically shaped articles. Especially, when the design of the air vent holes formed by processing the die is inadequate or when they are not uniformly processed, the following problems are caused.

Firstly, because the air is not efficiently discharged outside along with the filling of the resin material, the air remaining inside the die causes adiabatic compression, and the temperature only at this portion increases to cause the resin to be denatured and solidified. In this case, the denatured portion could be observed through carbonization, but the denaturation is in most cases too little to be visually recognized, and a change in physical property values such as a reduction in strength is caused in defective products.

Secondly, without such denaturation, if the remaining air causes nonuniform filling pressure in the die or nonuniform solidification, this results in deformation due to internal stress. These cause distorted molded articles or birefringence in the case of optical articles.

In contrast, according to the above-mentioned injection molding machine 1 of the present embodiment, the position and pressure of the die 3 can be strictly controlled, and the clearance between the joint surfaces 3a, 5a of the dies 3, 5 will be uniform all over the joint surfaces, so that a small and uniform clearance of about several hundred μm to 5 μm can be formed and the air can be freely discharged from the clearance depending on the filling amount and filling rate of the resin into the die.

That is, in order to solve the above-described problems in the die designing, it is important to ensure high-speed air discharge at low pressure along with the filling of the resin material and to fill the resin material at a high speed so that the uniform filling pressure and solidification of the resin will be achieved. To this end, the injection speed needs to be increased while a low injection pressure of the resin material is maintained. Moreover, it is also important to maintain a small clearance such that the resin material does not leak out to prevent valleys to be caused in the molded articles, and to change or maintain the force to press the die to enhance the transfer quality.

Therefore, if the clearance between the joint surfaces of the dies can be parallel and small as in the clamp mechanism of the present embodiment, the necessity of forming the air vent holes in the die as before is greatly reduced, and the gate can be easily set, leading to a significantly simplified design concept of the die.

To sum up, by employing the clamp mechanism of the present embodiment, the design concept of the die can be significantly simplified, and designing and manufacturing costs and manufacturing time (delivery time) of the die can be considerably reduced. It is also possible to manufacture dies for ultra-precise molding, thin article molding, asymmetrically shaped articles molding, ultra-precise transfer molding and molding of optical articles imposing high requirements on optical characteristics, which have heretofore been considered impossible or impractical due to a very low yield ratio.

Furthermore, in a conventional injection molding machine based on a toggle mechanism, the clearance between the joint surfaces of the dies cannot be freely controlled, and the pressure and impact cannot be controlled especially when the joint surfaces contact, so that the joint surfaces of the dies frequently contact each other in a tilted state, and the abrasion, deformation and the like of the joint surfaces of the dies have shortened the life of the die.

In contrast, according to the present embodiment, the clearance between the joint surfaces of the dies can be controlled with high accuracy, and the pressure and impact during the contacting of the joint surfaces can be controlled, with the result that the life of the die to be used can be considerably extended. In precise molding, dies are expensive, so that the extended life of the die provides a reduction in the cost of dies and an improvement in the yield ratio of molding, leading to a great contribution in improved productivity of the entire molding.

Effects of the present invention will next be examined in greater detail in terms of injection-molded products.

When the air in the die is pushed out by the resin material being filled, a die which does not effectively release gas requires unnecessary filling pressure to remove the air. This pressure is naturally placed on the air in the die, and the resin may be decomposed due to a temperature rise caused by high pressure in extraordinary cases. This is preferably visually recognized though carbonization or the like, but a reduction in strength and the like can not be recognized when the denaturation or the like does not occur, so that insufficient filling due to the insufficient release of gas and the strength reduction due to decomposition might not be noticed until problems such as damage due to insufficient strength are caused in an assembly process or in the market. Thus, defects due to the insufficient gas release are more frequently caused in an invisible manner, which are noticed by few people.

Furthermore, a state with satisfactory transferring quality is such that minute patterns can be molded on the surface of the die, but a state with low transfer quality is, in contrast, such that the air is not adequately vented. Therefore, in filling the resin, the resin is not completely filled into the space in the die due to air pressure in the die, and an air space may remain. Thus, the resin is not hit satisfactorily on the surface of the die, making it impossible to mold the minute patterns.

Moreover, contraction percentage is low and valleys are not easily caused in a high viscosity resin, especially in polycarbonate or acrylic. Given a molded article having a thickness of 1 mm, contraction is at about 5 μm, but if a parting is expanded to 10 μm without causing the valleys and the parting is closed at the completion of filling, the transferring quality can be increased with a pressure which is far lower than the filling pressure of the resin. It is, however, difficult to achieve perfect operation with the conventional mechanism, but this operation can be ensured in the present embodiment. Therefore, this mechanism is regarded as most effective for the molded articles requiring an ultra-fine surface.

The filling pressure of the resin material is originally dependent upon the viscosity of the resin, a runner, the gate and the shape of the molded article. However, the filling pressure actually includes resistance to press out the air, and if this resistance is high, extra filling pressure is applied so that the behavior of the resin is not smooth and the internal stress tends to remain.

Figure 8:
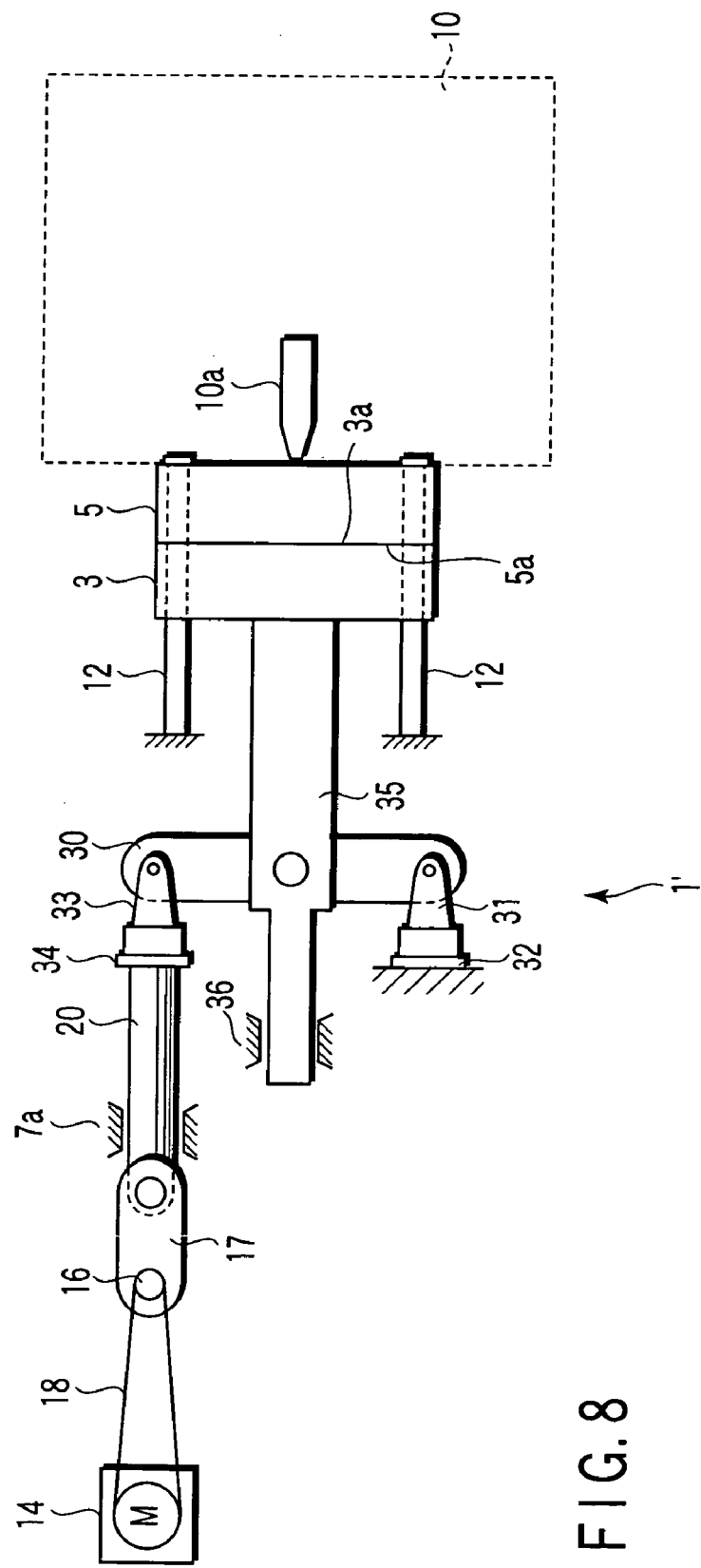
FIG. 8 is a plan view of a modification of the injection molding machine of FIG. 1 and a thermal pressing machine of FIG. 15.
Figure 9:
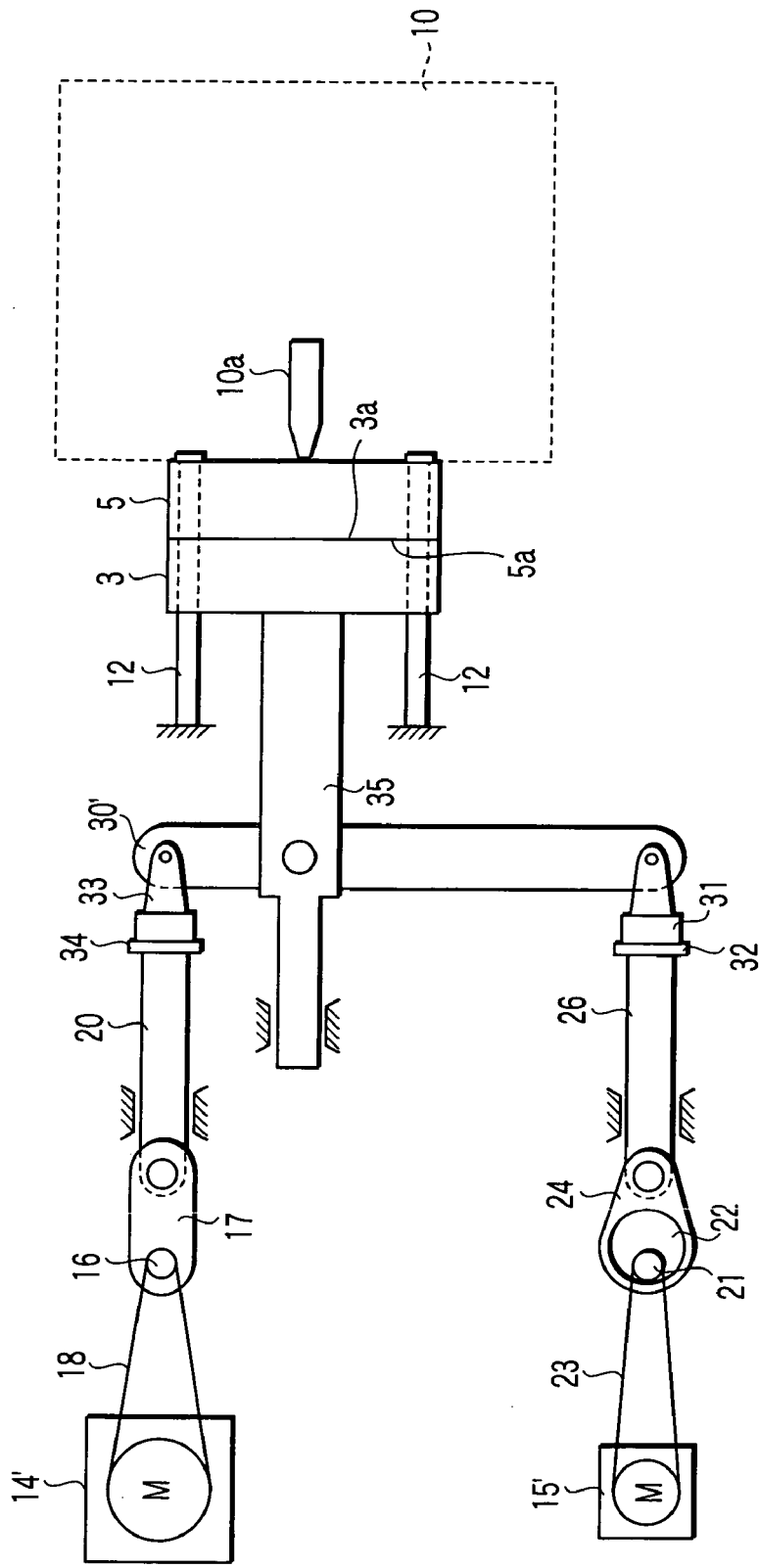
FIG. 9 is a plan view of another modification of the injection molding machine of FIG. 1 and the thermal pressing machine of FIG. 15.

It is to be noted that the effects of the present embodiment described above can also be achieved by employing, for example, structures shown in FIG. 8 and FIG. 9.

In the example shown in FIG. 8, the slide rail 32 of the supporting point rocking mechanism which slidably supports the supporting point of the lever arm 30 is fixedly provided in the frame 2. The configuration other than this part is the same as that of the injection molding machine 1 in the above-described embodiment, and therefore will not be described here in detail while giving the same numerals.

If this structure is employed, the supporting point of the lever arm 30 permits sliding in the Y direction only, and is fixed with respect to the X direction. In this case, when torque is produced by the AC servomotor 14 which urges the supporting point of the lever arm 30, repulsive force transmitted to the action point of the lever arm 30 via the main shaft 35 also acts equally on the front side supporting point rocking mechanism.

That is, in this case, all the stress concentrates on the main shaft 35 without causing the torsional stress in an injection molding machine 1' as a whole. It is to be noted that the supporting point of the lever arm 30 fixed with respect to the X direction has been described here, but the force point of the lever arm 30 may be fixed with respect to the X direction.

Furthermore, in the example shown in FIG. 9, the lever ratio of a lever arm 30' is changed, and two drive sources 14', 15' are changed. The configuration except for this part is the same as that of the above-described injection molding machine 1, and therefore will not be described in detail while giving the same numerals.

If this structure is employed, the distance from the action point to the supporting point of the lever arm 30', the distance from the action point to the force point, the torque produced by the AC servomotor 14' and the torque produced by the AC servomotor 15' are set to values such that all the stress concentrates on the main shaft 35. This makes it possible to design the injection molding machine more freely.

In other words, the lever ratio of the lever arm 30' can be changed to select the drive sources and drive transmitting mechanisms for the drive mechanisms more freely. For example, the distance from the action point of the lever arm 30' can be increased to operate with small torque with a great stroke, or the distance from the action point can be decreased to operate with large torque with a small stroke.

More specifically, the torque of the AC servomotor 14' can be increased to reduce the distance from the action point to the force point and to operate the main shaft 35 with a great stroke so that this will be the first stage driving of the clamp mechanism, while the torque of the AC servomotor 15' can be decreased to increase the distance from the action point to the supporting point for the main shaft 35 to operate with a small stroke so that this will be the second stage driving.

If the structure in FIG. 9 is employed, the distance from the supporting point to the action point of the lever arm 30', the distance from the force point to the action point, the sliding friction of the supporting point rocking mechanism and the sliding friction of the force point rocking mechanism are set to values such that the stress concentrates on the action point of the lever arm 30'. That is, the lever ratio of the lever arm 30', and the supporting point rocking mechanism and the force point rocking mechanism are selected so that the stress caused by the sliding frictional forces acting on the supporting point and the force point of the lever arm 30' will concentrate on the action point.

It is to be noted that this invention is not limited to the embodiment described above, and various modifications can be made within the scope of this invention.

For example, the structure to press the lever arm 30 in the driving direction using the two drive mechanisms has only been described in the above embodiment, but this is not a limitation and a structure which pulls the lever arm 30 from the opposite side of the driving direction may be employed.

Figure 10:
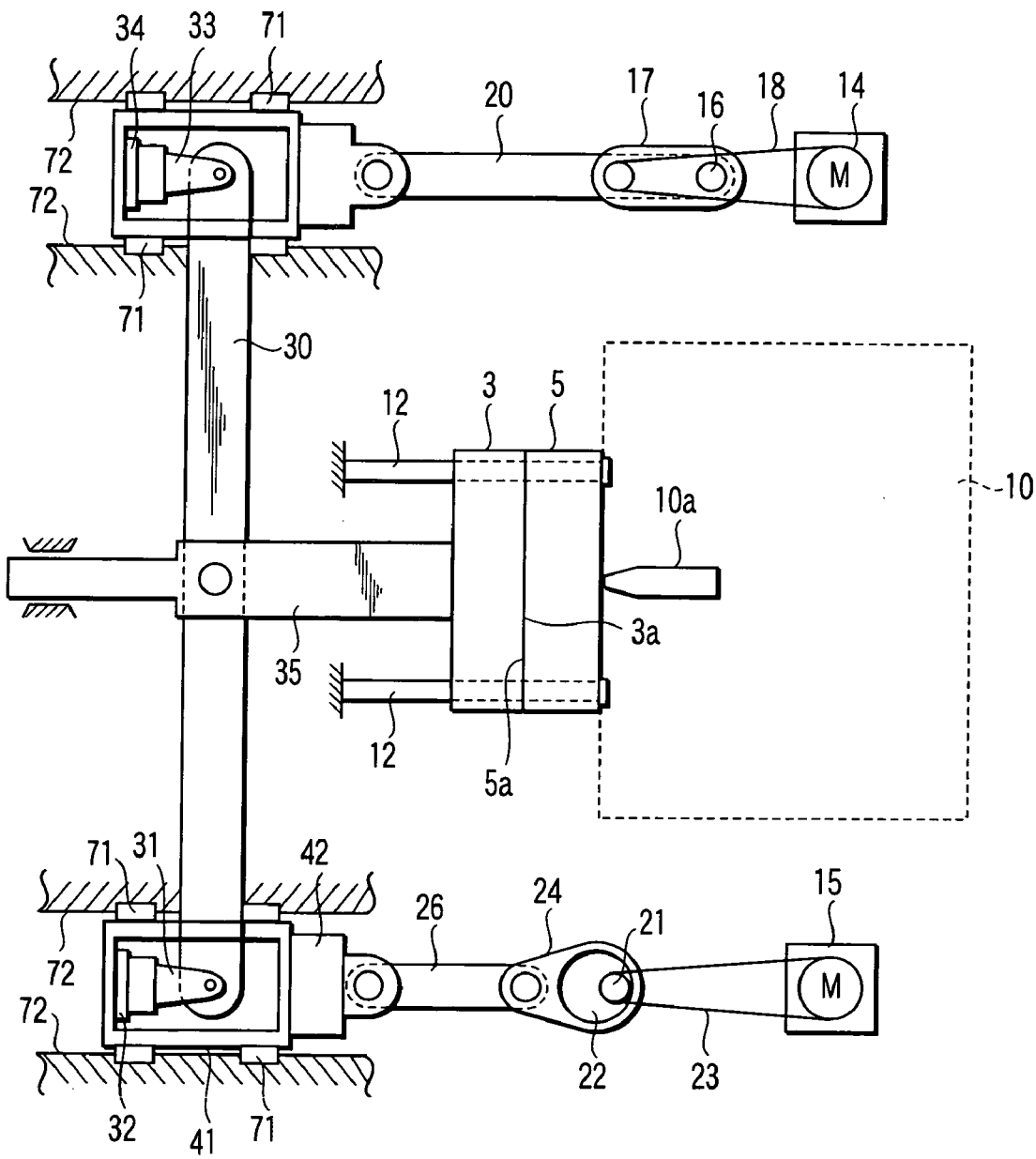
FIG. 10 is a plan view of a modification in which two drive mechanisms of the injection molding machine of FIG. 1 and the thermal pressing machine of FIG. 15 are provided on the opposite side.

FIG. 10 shows a modification having a structure which pulls the lever arm 30 in the opposite direction. In this structure, components functioning in the same manner as those in the injection molding machine 1 in the above-described embodiment are given the same numerals and will not be described in detail.

That is, in this structure, the slide rail 32 of the supporting point rocking mechanism attached to the supporting point of the lever arm 30 is fixedly provided on an inner wall of a rectangular box member 41, and one end of the slide shaft 26 is pivotally attached to a supporting portion 42 integrally provided in a protruding state on an opposite outer wall of the box member 41. The slide shaft 26 is provided to extend in the direction opposite to that in the above-described embodiment, and the crank mechanism and the AC servomotor 15 which are the same as those in the above-described embodiment are connected in the opposite direction.

Furthermore, in the same manner, the slide rail 34 of the force point rocking mechanism attached to the force point of the lever arm 30 is fixedly provided on an inner wall of a rectangular box member 43, and one end of the slide shaft 20 is pivotally attached to a supporting portion 44 integrally provided in a protruding state on an opposite outer wall of the box member 43. The slide shaft 20 is provided to extend in the direction opposite to that in the above-described embodiment, and the crank mechanism and the AC servomotor 14 which are the same as those in the above-described embodiment are connected in the opposite direction.

Moreover, slide mechanisms are provided which support the box members 41, 43 slidably in the X direction in such a positional relation as to grip the box members 41, 43. Each of the slide mechanisms has sliders 71 fixedly provided on the outer wall of the box members 41, 43, and rails 72 which slidably support the sliders 71. Thus, the box member 41 containing the supporting point rocking mechanism and the box member 43 containing the force point rocking mechanism are supported slidably in the X direction, such that the guides for the slide shafts 20, 26 which have been necessary in the other embodiments described above are not necessary. It is to be noted that such slide mechanisms may be employed for the devices in the other embodiments described above and can directly support the supporting point rocking mechanism and the force point rocking mechanism slidably in the X direction.

In such a modification, the effects similar to those in the embodiments described above can also be provided, and the size of the device along the driving direction can be reduced, thus allowing space to be saved.

Furthermore, the type of rocking mechanism having the slide rail has been described in the above embodiment as the support mechanism which supports the supporting point and force point of the lever arm 30 slidably in the Y direction, but this is not a limitation and various modifications can be considered for the supporting point rocking mechanism and the force point rocking mechanism. A representative modification of the force point rocking mechanism will be described below.

For example, as shown in FIG. 11, a roller 51 may be pivotally attached to the force point of the lever arm 30, and a slide groove member 52 to guide the roller 51 may be attached to the end of the slide shaft 20.

Furthermore, as shown in FIG. 12, a rectangular block 53 to slide along a slide groove 52a of the slide member 52 may be fixedly provided at the force point of the lever arm 30, instead of the above-mentioned roller 51.

Still further, the drive mechanisms combining the crank mechanism with the AC servomotors 14, 15 have been described in the above embodiment as the drive mechanisms which urge the supporting point and the force point of the lever arm 30, respectively, but this is not a limitation, and, for example, a hydraulically driven cylinder mechanism 61 may be employed as the drive mechanism, as shown in FIG. 13. Alternatively, a ball screw mechanism 63 driven by a motor 62 may be employed for the drive mechanism as shown in FIG. 14.

Still further, the present invention applied to the plastic injection molding machine using the resin as the material to be molded has been described in the above embodiment, but this is not a limitation, and the present invention can be applied to a press mechanism which molds metal materials including alloys, or the present invention can be applied to a glass molding machine using a glass material as the material to be molded.

Still further, the present invention applied to the comparatively large plastic injection molding machines or pressing machines has been described in the above embodiment, but this is not a limitation, and the present invention can also be applied to remote-controlled manipulators which require strict position control and pressure control used, for example, in outer space or dangerous zones where people cannot enter easily or in a sterilized space in a medical situation, or to micromachines such as a joint mechanism of a robot arm.

Still further, the two AC servomotors 14, 15 are controlled so that one of them is stopped and the other is driven in the above-described embodiment, but this is not a limitation, and the two AC servomotors 14, 15 may be driven simultaneously to move the supporting point and force point of the lever arm 30 simultaneously.

Moreover, the structure in which the four tie bars 12 support the fixed platen 11 on which the fixed-side die 5 is fixedly provided has been described in the above embodiment, but this is not a limitation, and an even number of tie bars 12 disposed symmetrically in the Y direction with the main shaft 35 in between may be provided.

Next, an ultra-precise thermal pressing device 80 (pressing machine) (hereinafter simply referred to as a thermal pressing machine 80) to which the present invention is applied will be described referring to FIG. 15. The basic structure and function of this thermal pressing machine 80 are the same as those of the injection molding machine 1 described above, so that components functioning in the same manner are given the same numerals and will not be described in detail.

The thermal pressing machine 80 of the present embodiment is suitable for, for example, subjecting a semiconductor substrate to a thermal surface treatment, directly embossing with a microgroove pattern, or performing precise transfer molding for a film-like optical disk or an optical waveguide of a liquid crystal display.

As shown in FIG. 15, the thermal pressing machine 80 has a case 81 forming the contour of the device. A substantially rectangular plate shaped fixed-side press plate 82 is fixedly provided in the vicinity of a lower end of the case 81. The press plate 82 functions in the same manner as the fixed platen 11 of the injection molding machine 1 described above, and is provided to be highly accurately positioned substantially parallel to the horizontal surface (YZ plane).

A movable side press plate 83 is provided at a position separated upward in the drawing from the press plate 82. This press plate 83 functions in the same manner as the movable platen 13 of the injection molding machine 1 described above, and is moved to slide in the X direction while maintaining the highly accurate parallelism with the press plate 82, thereby being in and out of contact with the press plate 82.

At this point, the press plate 83 is guided by guide rods 84 provided to protrude on the rear side of the press plate 83 and by guide holes 85 provided to correspond to the case 81. The guide rods 84 function in the same manner as the tie bars 12 of the injection molding machine 1 described above, and an even number of guide rods 84 are provided symmetrically with respect to the virtual surface which passes the center of the main shaft 35 and which is at an equal distance from the supporting point and force point of the lever arm 30.

The two AC servomotors 14, 15 to drive the press plate 83 are fixedly provided substantially in the center of the case 81. In the present embodiment, the first crank mechanism using the motor 14, which is on the left side of the drawing, as the drive source and the second crank mechanism using the motor 15, which is on the right side of the drawing, as the drive source have the same structure.

To explain the left first crank mechanism as a representative example, the eccentric cam 22 is fixedly provided on the rotation shaft 14a of the AC servomotor 14. The eccentric cam 22 is rotatably received in the cam follower 24. If the motor 14 is rotated, the eccentric cam 22 rotates to move the cam follower 24 in the X direction.

In contrast, the base end portion of the main shaft 35 provided to extend from the rear center of the press plate 83 is pivotally attached to the action point in the center of the lever arm 30. Ends of the above-mentioned cam followers 24 are pivotally attached to the supporting point and the force point of the lever arm 30 which are at an equal distance from the action point, via the supporting point rocking mechanism and the force point rocking mechanism, respectively.

As the supporting point rocking mechanism and the force point rocking mechanism have the same structure, the force point rocking mechanism on the left side of the drawing will be described here as a representative example. Especially, the supporting point rocking mechanism and the force point rocking mechanism have exactly the same frictional resistance.

The force point rocking mechanism has the force point block 33 pivotally supporting the lever arm 30 at its force point, the slide rail 34 attaching the force point block 33 slidably in the Y direction, and the box member 41 which is pivotally attached to the end of the cam follower 24 and in which the slide rail 34 is fixedly provided on its inner wall.

A plurality of guide rods 86 is provided to protrude on the outside of each of the box members 41, and cooperates with guide holes 87 provided to correspond to the case 81 to guide the sliding movement of the box member 41 in the X direction.

Figure 16:
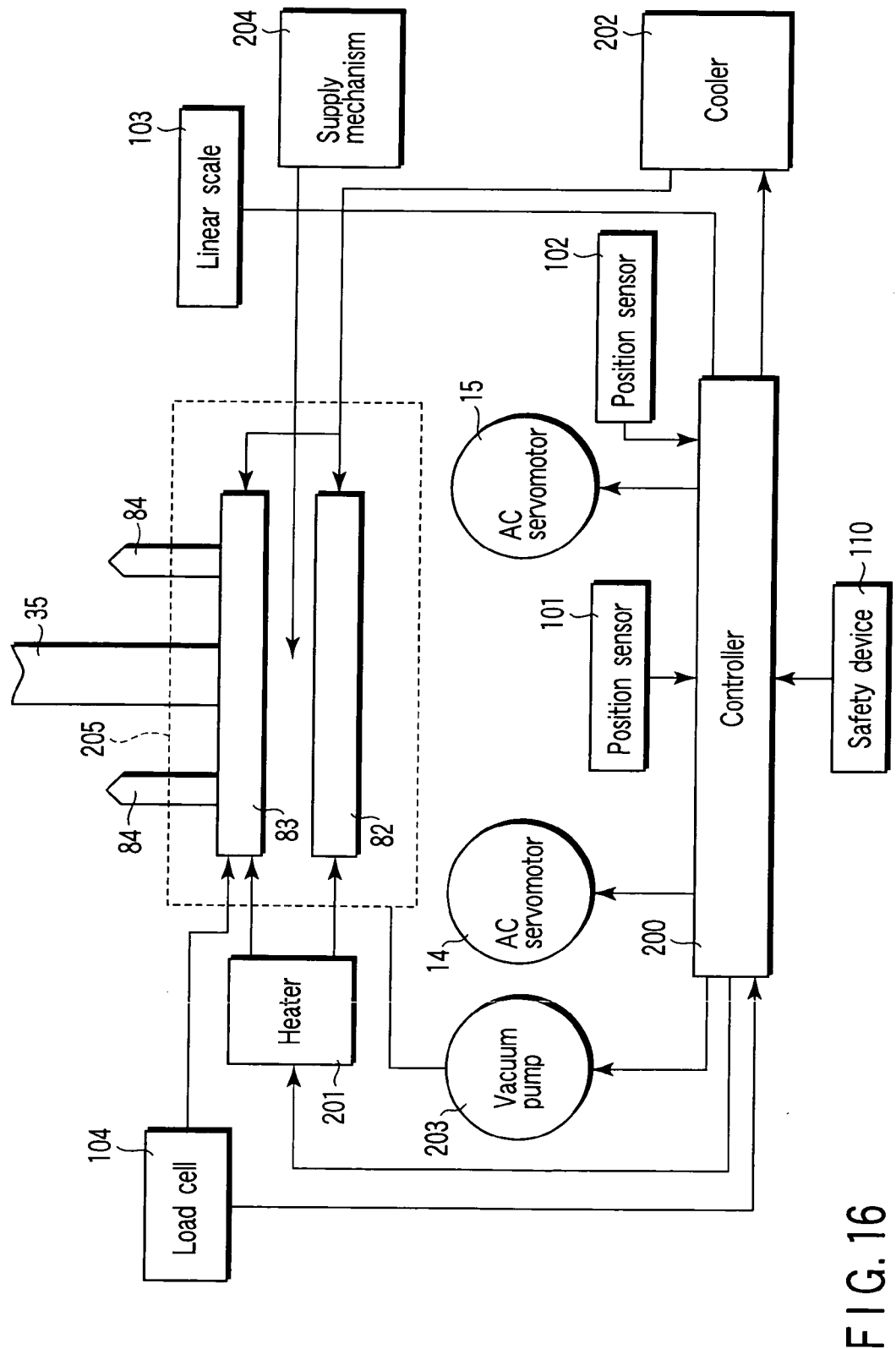
FIG. 16 is a block diagram of a control system to control the operation of the thermal pressing machine of FIG. 15.

FIG. 16 is a block diagram of a control system to control the operation of the thermal pressing machine 80 having the above-mentioned structure.

The two AC servomotors 14, 15 and the two position sensors 101, 102 provided to correspond to the motors 14, 15 are connected to a controller 200 of the thermal pressing machine 80. Each of the position sensors 101, 102 detects a crank position needed to control the AC servomotors 14, 15.

Furthermore, the linear scale 103 to measure in microns the position along the X direction of the press plate 83, and the load cell 104 to measure the pressure of the press plate 83 are connected to the controller 200. Instead of the linear scale 103, a laser measurement instrument or the like may be used which is capable of measuring the position of the press plate 83 by the submicron.

Moreover, a heater 201, a cooler 202, a vacuum pump 203 and a supply mechanism 204 are connected to the controller 200. The heater 201 heats and the cooler 202 cools off the press plates 82, 83 to a desired temperature. The vacuum pump 203 draws a vacuum into a vacuum chamber 205 which forms vacuum atmosphere in a space where the two press plates 82, 83 are disposed. The supply mechanism 204 supplies a member to be pressed between the two press plates 82, 83. The member to be pressed may be supplied in a preheated state.

Furthermore, a safety device 110 is connected to the controller 200. The safety device 110 ascertains that the device cover is closed. In addition, an emergency stop switch and the like are also included in the safety device 110.

Next, the operation of the above thermal pressing machine 80 will be described.

First, the AC servomotor 15 to operate the second crank mechanism is stopped, and the supporting point of the lever arm 30 is stopped. In this state, the AC servomotor 14 is urged to operate the first crank mechanism so that the first crank mechanism is operated to slide the cam follower 24. Thus, the lever arm 30 greatly pivots on the supporting point, and the main shaft 35 connected to the action point of the lever arm 30 greatly slides in the X direction, and then, the moving side press plate 83 attached to the end of the main shaft 35 is moved greatly toward the fixed-side press plate 82.

After the press plate 83 is moved with a great stroke as described above, the AC servomotor 14 is in turn stopped to stop the first crank mechanism, and the force point of the lever arm 30 is stopped with respect to the X direction. Thereafter, the force point will function as the supporting point. In this state, the AC servomotor 15 is urged to operate the second crank mechanism, such that the cam follower 24 slides along the X direction. At this moment, the lever arm 30, in turn, slightly pivots on the supporting point of the lever arm 30 which has stopped as described above.

As described above, according to the thermal pressing machine 80 of the present embodiment, the stresses except in the X direction deny each other and do not act on the main shaft 35 which has been urged via the supporting point rocking mechanism or the force point rocking mechanism, as in the injection molding machine 1 described above. Therefore, even if the size of the press plate 83 is about 2 m×2 m, the bottom dead center and the pressure of the press plate 83 can be controlled with high accuracy while maintaining highly accurate parallelism.

Especially, the following effects can be provided as the peculiar effects when the present invention is applied to the thermal pressing machine.

Firstly, the above-described thermal pressing machine 80 ensures that wires for very highly integrated circuits can be easily formed.

Heretofore, when the wire for the ultra-highly integrated circuit is formed, a silicon substrate is patterned with a mask by, for example, chemical vapor deposition (CVD) or plating, and then the wire is formed in a microgroove by, for example, etching or chemical mechanical polishing (CMP).

Therefore, the conventional method requires much manpower and long time for treatments. In addition, the dependency on chemical treatments leads to poor reproducibility and a low yield ratio.

Moreover, copper has recently been increasingly used instead of aluminum as the material for the wires, but the problem with the conventional chemical treatment is that the copper corrodes the silicon substrate. Further, the wires easily come off according to the conventional method.

In contrast, if the above-described thermal pressing machine 80 is used, the silicon substrate can be embossed directly with the microgroove pattern. Further, the copper or aluminum micropattern can be inserted into the groove for direct compression bonding or can be thermally compression-bonded. This makes it possible to reduce the manpower, to reduce treatment time, and to reduce operation costs and equipment expenses.

Furthermore, as the chemical treatments are not necessary as heretofore, elements of instability in treatments attributed to the chemical treatments such as the etching and CMP can be completely excluded to raise the yield ratio.

In addition to this, the above-described thermal pressing machine 80 can also be utilized for the surface treatment or compression bonding treatment of the semiconductor substrate, so that the treatment time can be reduced to raise the yield ratio.

Secondly, the above-described thermal pressing machine 80 ensures that a multilayer printed board can be easily bored or perforated.

Heretofore, the multilayer printed board has been bored or perforated by mechanical cutting such as drilling or polishing. In this case, processing accuracy is low, processing time is long, and reproducibility is low.

In contrast, if the above-described thermal pressing machine 80 is used, one substrate can be bored in one step, and a plurality of substrates can be perforated while the multiple layers are thermally compression-bonded at the same time. This makes it possible to raise the dimensional accuracy associated with boring and perforating and to reduce the processing time.

Thirdly, the above-described thermal pressing machine 80 can be used to easily perform precise and minute transfer molding for the resin material.

Heretofore, the precise and minute transfer molding for optical members such as the optical waveguide of the liquid crystal display, optical disks and lenses has been performed mainly by injection molding. Moreover, manufacturing systems have not been established in the formation of display films for electroluminescent displays made of resins, in the precise and minute molding of, for example, biochips to identify DNA, protein and the like, or in the formation of pits into a film-like optical disk layer.

For example, in the optical waveguide of the liquid crystal display having a large area and a thickness of about 10 mm, it has taken several minutes to manufacture one product.

In contrast, if a product is film-shaped with a thickness of about 0.1 mm, the injection molding does not allow the resin material to go round well, resulting in a defective product. Further, when a large number of comparatively small products are manufactured at the same time, it is difficult to design runners to link the products, and strict conditions are imposed on molding, thus making it difficult to manufacture products with a stable shape.

In contrast, if the above-described thermal pressing machine 80 is used, precise and minute transfer molding can be performed for the resin material regardless of the thickness of the product. In this case, the resin material may be preheated.

If the thermal pressing machine 80 is used, it is not necessary to inject the resin into the die as in the injection molding, so that a vacuum can be easily formed in the die, and the air does not remain on the surface of the die, thereby preventing transfer defects.

Furthermore, if the thermal pressing machine 80 is used, the bottom dead center of the die can be accurately controlled, so that regardless of the thickness and size of the resin material, the runner is not needed and precise and minute transfer molding can be performed in a short time. This makes it possible to reduce the treatment time and to reduce operation costs and equipment expenses.

Still further, if the thermal pressing machine 80 is used, it is possible to form the display film in which an electroluminescent display is to be sealed, and to perform the precise and minute transfer molding for biochips to identify DNA and protein.

Fourthly, the use of the above-described thermal pressing machine 80 ensures that such processes are easily performed as: to a comparatively large glass substrate for a plasma display, a liquid crystal display or the like, affixing films including electrodes and dielectrics, heating and baking them, or injecting liquid crystal.

In such processes, heretofore, there has been a problem that it takes too much time or pixels themselves would be defective, leading to low productivity.

In contrast, the use of the above-described thermal pressing machine 80 ensures that processes such as heating and baking, and liquid crystal injection can be easily performed, so that the flatness and parallelism of the glass substrate can be strictly maintained, displays can be manufactured with high accuracy, and the yield ratio can be raised.

As described above, the press mechanism, the clamp mechanism, and the molding machine using this clamp mechanism of this invention have the configurations and functions mentioned above, so that while highly accurate parallelism of the press plate is maintained, the position and pressure of the press plate can be controlled with high accuracy, thus making it possible to improve the yield ratio of products and to improve quality.

Furthermore, according to this invention, precise and small molded articles, which have heretofore been considered difficult, can be molded by use of the dies, and, for example, optical components and optical disks which are considered impossible to manufacture with traditional techniques because of their extremely high requirements in transfer quality can also be molded.

Still further, applying this invention to the thermal pressing device facilitates manufacturing of ultra-highly integrated circuits having minute wiring patterns, the surface treatment or compression bonding treatment of a semiconductor substrate, boring and perforating of a multilayer printed circuit board, precise and minute transfer molding of optical disks and biochips, a compression bonding process, a thermal treatment process and a liquid crystal injection process for a large screen display, and the like.

What is claimed is:

1. A press mechanism comprising:
    a lever member having a supporting point at one end, having a force point at the other end, and having an action point between the supporting point and the force point;
    a shaft which is coupled to the action point of the lever member and which pivots the lever member to move along its axial direction;
    a press plate fixedly provided at an end in a driving direction of the shaft;
    a first support mechanism which supports the lever member pivotally at the force point and movably in a direction traversing the driving direction;

a second support mechanism which supports the lever member pivotally at the supporting point and movably in a direction traversing the driving direction;

a first drive mechanism which urges the first support mechanism in the driving direction so that the lever member pivots on the supporting point to drive the press plate; and a second drive mechanism which urges the second support mechanism in the driving direction so that the lever member pivots on the force point to drive the press plate.

2. The press mechanism according to claim 1, wherein sliding frictions of the first and second support mechanisms are set to values such that a stress acting on the lever member is offset at the action point.

3. The press mechanism according to claim 1, wherein a distance from the supporting point to the action point of the lever member, a distance from the force point to the action point, the sliding friction of the first support mechanism and the sliding friction of the second support mechanism are set so that the stress caused by the sliding frictions to act on the lever member is offset at the action point.

4. The press mechanism according to claim 3, wherein the distance from the supporting point to the action point is equal to the distance from the force point to the action point, and the sliding frictions of the first and second support mechanisms are equal.

5. The press mechanism according to claim 1, further comprising: a case to which the first and second drive mechanisms are fixedly attached; and a guide member which is fixedly provided in this case and which guides the press plate along the driving direction, wherein a distance from the action point to the supporting point, a distance from the action point to the force point, a torque produced by the first drive mechanism, a torque produced by the second drive mechanism, and a position to fixedly provide the guide member in the case are set such that a stress acting on the case is offset on an axis line of the shaft.

6. The press mechanism according to one of claims 3 to 5, wherein the first support mechanism is fixedly provided in a case of a device.

7. A press mechanism comprising:

a lever member having a supporting point at one end, having a force point at the other end, and having an action point between the supporting point and the force point;

a shaft which is coupled to the action point of the lever member and which pivots the lever member to move along its axial direction;

a press plate fixedly provided at an end in a driving direction of the shaft;

a first support mechanism which supports the lever member pivotally at the force point and movably in a direction traversing the driving direction;

a second support mechanism which supports the lever member pivotally at the supporting point and movably in a direction traversing the driving direction; and a first drive mechanism which urges the first support mechanism in the driving direction so that the lever member pivots on the supporting point to drive the press plate;

wherein sliding frictions of the first and second support mechanisms are set to values such that a stress acting on the lever member is offset at the action point.

8. A clamp mechanism comprising:

a lever member having a supporting point at one end, having a force point at the other end, and having an action point between the supporting point and the force point;

a shaft which is coupled to the action point of the lever member and which pivots the lever member to make a sliding movement along its axial direction;

a first die which is fixedly attached to a moving member fixedly provided at an end in a driving direction of the shaft;

a second die which is provided on a track on which the first die moves and which has a joint surface contacting a joint surface of the first die;

a first support mechanism which supports the lever member pivotally at the force point and movably in a direction traversing the driving direction;

a second support mechanism which supports the lever member pivotally at the supporting point and movably in a direction traversing the driving direction;

a first drive mechanism which urges the first support mechanism in the driving direction so that the lever member pivots on the supporting point to drive the first die toward the second die;

a second drive mechanism which urges the second support mechanism in the driving direction so that the lever member pivots on the force point to drive the first die toward the second die;

a case in which the first and second drive mechanisms are fixedly attached and in which the second die is fixedly provided at a predetermined position; and a guide member which is fixedly provided in this case and which guides the moving member along the driving direction.

9. The clamp mechanism according to claim 8, wherein a distance from the action point to the supporting point, a distance from the action point to the force point, a torque produced by the first drive mechanism, a torque produced by the second drive mechanism, and a position to fixedly provide the guide member in the case are set such that a stress acting on the case is offset on an axis line of the shaft.

10. The clamp mechanism according to claim 8, wherein a distance from the supporting point to the action point of the lever member, a distance from the force point to the action point, a sliding friction of the first support mechanism and a sliding friction of the second support mechanism are set so that a stress caused by the sliding frictions to act on the lever member is offset at the action point.

11. The clamp mechanism according to claim 10, wherein the distance from the supporting point to the action point is equal to the distance from the force point to the action point, and the sliding frictions of the first and second support mechanisms are equal.

* * * * *